Dec. 7, 1965   E. J. BEVILACQUA ETAL   3,222,051
VACUUM COPY HOLDER
Filed Nov. 30, 1962   3 Sheets-Sheet 1

INVENTORS
EDMUND J. BEVILACQUA
GEORGE F. MOYER
DOUGLAS F. MUIR, Jr.
BY
ATTORNEY

Dec. 7, 1965  E. J. BEVILACQUA ETAL  3,222,051
VACUUM COPY HOLDER
Filed Nov. 30, 1962 3 Sheets-Sheet 2
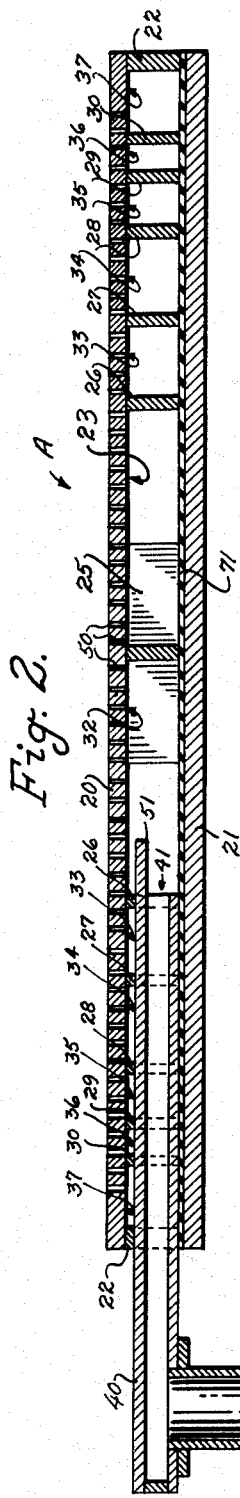
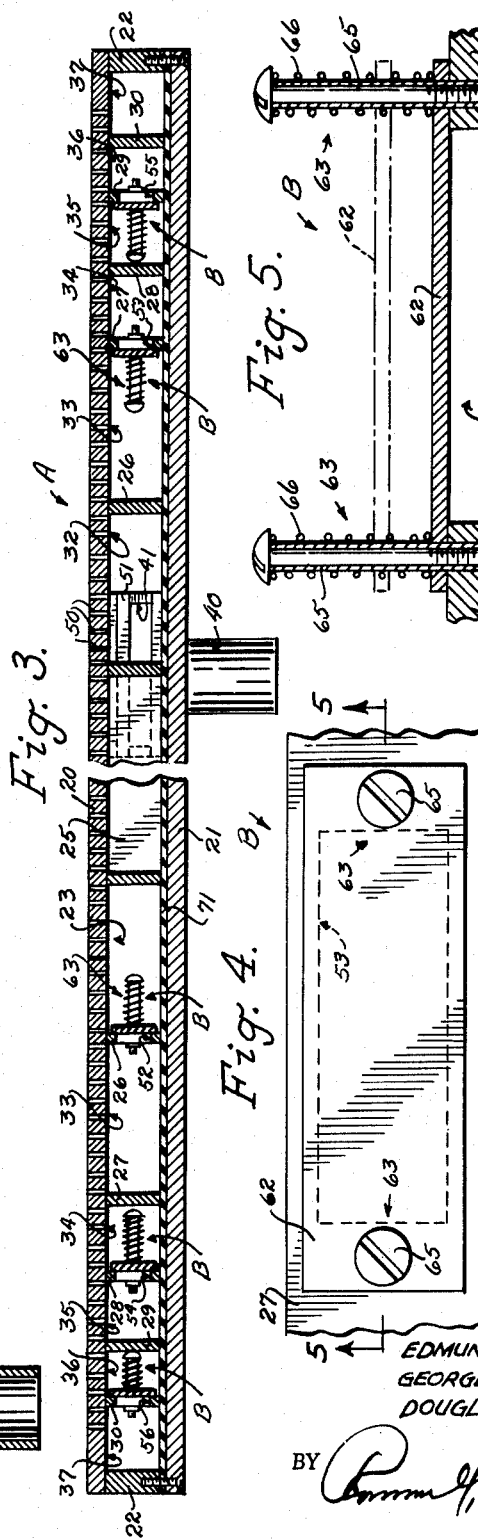
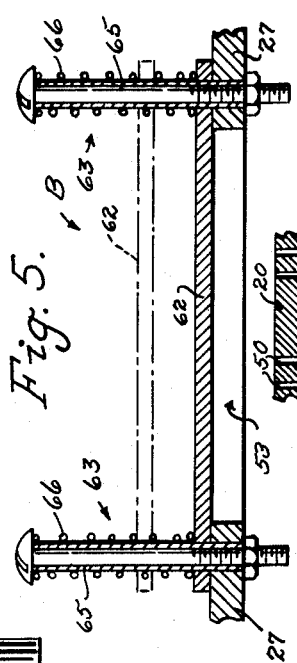
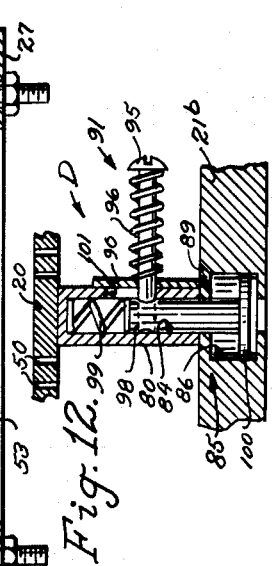
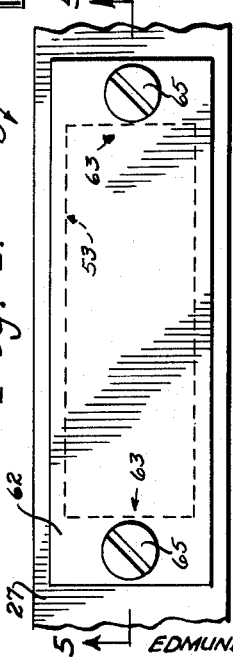
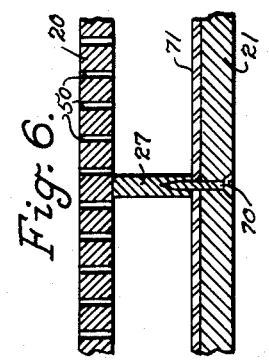
INVENTORS
EDMUND J. BEVILACQUA
GEORGE F. MOYER
DOUGLAS F. MUIR, Jr.
BY
ATTORNEYS

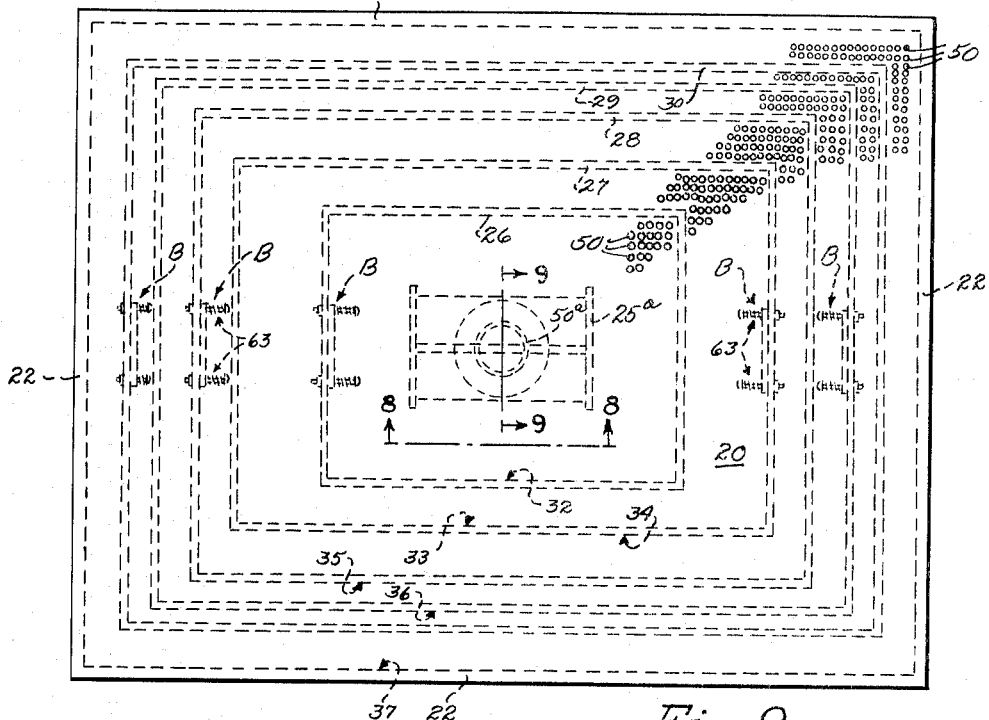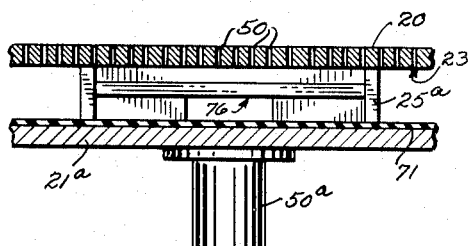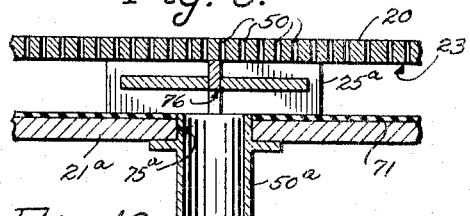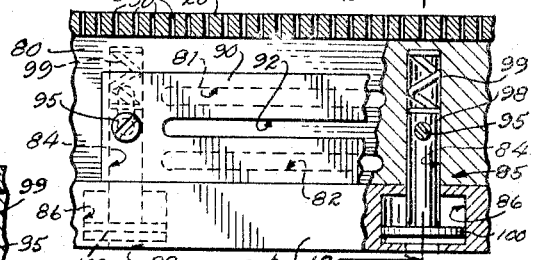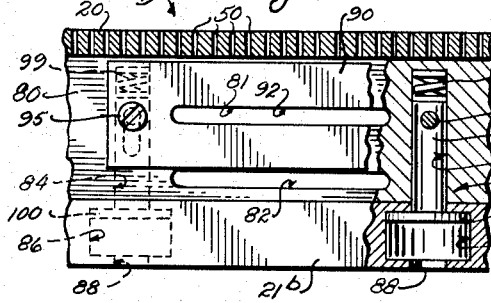
INVENTORS
EDMUND J. BEVILACQUA
GEORGE F. MOYER
DOUGLAS F. MUIR, Jr.
ATTORNEYS United States Patent Office 3,222,051
Patented Dec. 7, 1965

3,222,051
VACUUM COPY HOLDER
Edmund J. Bevilacqua, Kensington, and George F. Moyer and Douglas F. Muir, Jr., Silver Spring, Md., assignors, by direct and mesne assignments, to Elmer F. Blanchard
Filed Nov. 30, 1962, Ser. No. 241,306
13 Claims. (Cl. 269—21)

This invention relates to improvements in vacuum copy holders.

It has long been a problem to provide a holder which will support sheet material, of various widths, in a perfectly flat and smooth position in a manner which will facilitate working with the sheet, such as in photographic, topographic and printing work.

We are aware that others have endeavored to solve this problem by use of vacuum or suction devices by which such sheet is mounted upon a large board and held in place by means of vacuum or suction. Such previously provided devices have, however, failed to solve the problem, in that they have usually required a cover over the face of the material which is to be worked, which, in the case of the photographic arts, would cause light refraction; in that it is difficult to place previously folded or wrinkled copy upon such supports; and in that the vacuum regulators which are used in such devices usually require that the copy be held down upon the support until sufficient pressure is built up to support the copy by means of vacuum or suction. Such devices likewise usually employ manually operated valves in order to handle sheets of various size.

Our improved copy holder overcomes each of the short-comings of these prior devices, in that it enables support of sheet material, in a flat position, without the use of an overlay, over print, or any cover whatsoever; accommodates material of various size, even accommodating two or more sheets of material of different sizes at the same time; includes an improved automatic valve system which automatically provides the proper range of vacuum according to the size of the sheets supported thereby; the valve system maintains a pressure differential between the various channels of the holder so that the requisite or suction required for holding a sheet of given size in place upon the holder is immediately available, eliminating the necessity of holding the copy upon the sheet until appropriate pressure has built up in the various channels; is constructed and arranged so that it may be evacuated from the front, rear, or any side and thus may be provided with a flat back portion, so that it may be used upon a level surface, such as a table top; and utilizes a high cubic air displacement, which facilitates the use of a high volume vacuum system.

Other objects and advantages of the invention will be apparent during the course of the following detailed description, taken in connection with the accompanying drawings, forming a portion of this specification, and in which drawings:

FIG. 2 is an enlarged sectional view taken substantially on the line 2—2 of FIG. 1.

FIG. 3 is an enlarged sectional view taken substantially on the line 3—3 of FIG. 1.

FIG. 4 is an enlarged front elevation of our improved valve means taken substantially on the line 4—4 of FIG. 1.

FIG. 5 is a sectional view taken substantially on the line 5—5 of FIG. 4.

FIG. 6 is an enlarged sectional view taken substantially on the line 6—6 of FIG. 1.

FIG. 7 is a top plan view of a modified form of vacuum copy holder.

FIG. 8 is an enlarged sectional view taken substantially on the line 8—8 of FIG. 7.

FIG. 9 is an enlarged sectional view taken substantially on the line 9—9 of FIG. 7.

FIG. 10 is a view similar to FIG. 4, but showing a modified form of valve means.

FIG. 11 is a view similar to FIG. 10, showing the modified valve means in its open position.

FIG. 12 is a sectional view taken substantially on the line 12—12 of FIG. 10.

Figure 1:
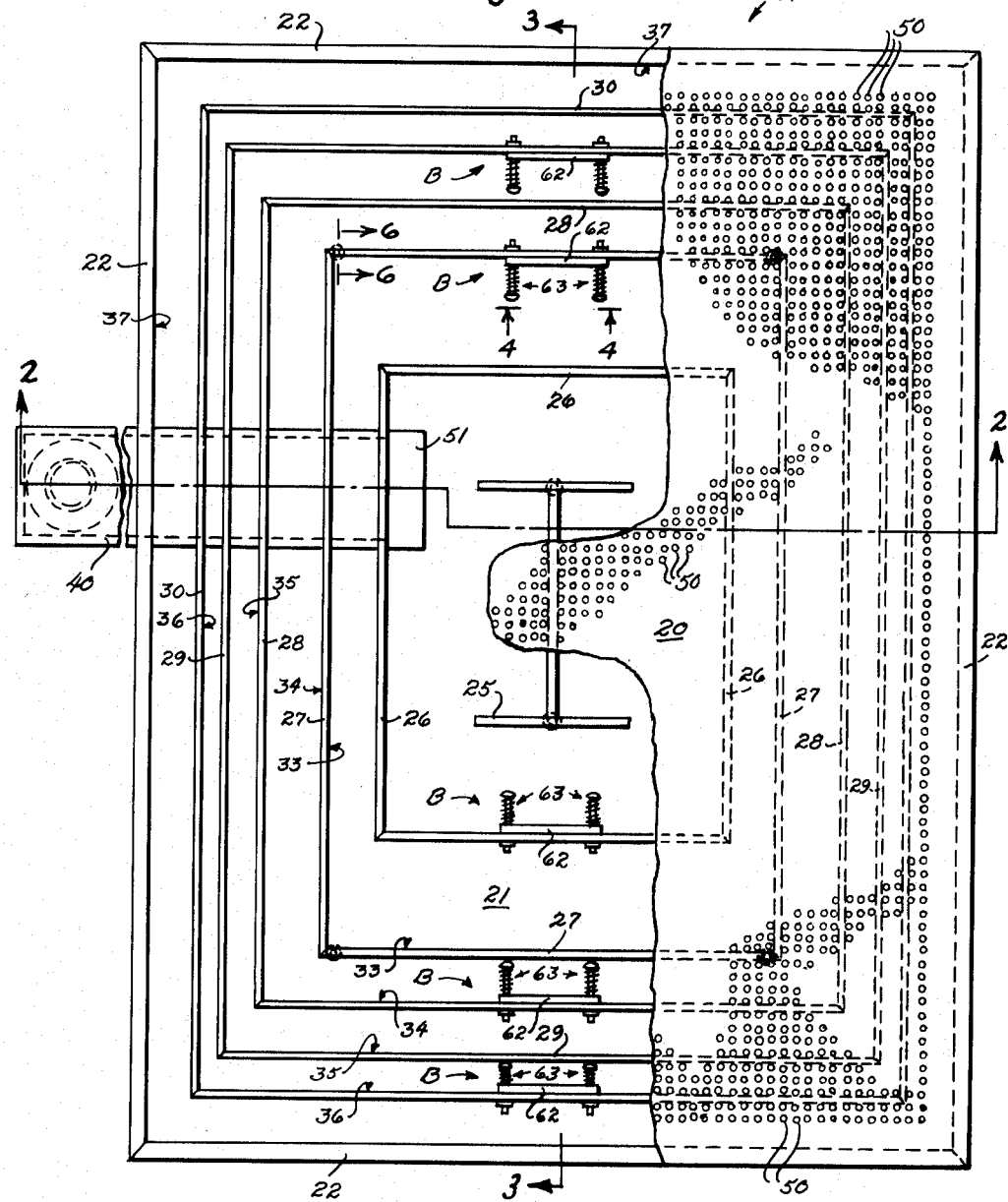
FIG. 1 is a top plan view of our improved vacuum copy holder, portions of the material supporting face thereof being broken away to show preferred details.

In the drawings, wherein for the purpose of illustration are shown preferred and modified embodiments of the invention, and wherein similar reference characters designate corresponding parts throughout the several views, the letter A may generally designate the form of vacuum copy holder as shown in FIGS. 1–6, inclusive, having valve means B; C the modified form of vacuum copy holder as shown in FIGS. 7, 8, and 9; and D the modified valve means as shown in FIGS. 10–12.

The vacuum copy holder A preferably comprises a receptacle having a material receiving face 20, a back 21, and side portions 22, which define a receptacle chamber 23. A support brace 25 is preferably provided at a point intermediate the chamber 23. Walls 26, 27, 28, 29 and 30 are provided in chamber 23, such walls being spaced apart from the central support 25, from each other, and from the side walls 22, dividing the chamber 23 into a plurality of channels. In the form of the invention shown, wall 26 defines a central channel 32, extending about support brace 25; wall 27 is spaced apart from and extends about wall 26 to provide a channel 33; wall 28 is spaced apart from and extends about wall 27 to provide a channel 34; wall 29 is spaced apart from and extends about wall 28 to provide a channel 35; wall 30 is spaced apart from and extends about wall 29 to define a channel 36; and wall 30 extends about wall 29 and is spaced apart from walls 22 and 29, to define an outermost channel 37.

Any suitable exhaust means may be used for reducing air pressure in chamber 23. In form A of the invention we have shown a manifold tube 40 extending from outwardly of end wall 22, opening into the central channel 32, as providing an outlet for the exhausting of air from central channel 32. The brace 25 is preferably provided in channel 32 in juxtaposition with respect to the manifold opening 41 so that the brace 25 forms a baffle means which directs the course of the air exhausted from channel 32 is such a manner as to distribute the air pressure reduction effect of the exhaust means throughout channel 32.

Any suitable form of pump may be interconnected to the manifold 40 for exhausting the air from our vacuum copy holder. The size and type of pump will depend to a great extent upon the size and the type of material which is to be supported upon the holder. We preferably utilize a rotary exhaust pump which yields a high cubic air displacement.

A plurality of spaced and distributed openings 50 are provided in the material receiving face 20, which openings lead from one surface of the face to the other, so that suction may be directly exerted from the various channels to the material to be supported thereon, thereby holding, by suction, the material upon the face 20. The openings 50 are preferably provided so that an equal number open into each of the channels, 32, 33, 34, 35, 36 and 37. For instance, in one form of board we have provided six hundred openings leading into channel 32, six hundred openings leading into channel 33, six hundred openings leading into channel 34, six hundred openings leading into channel 35, six hundred openings leading into channel 36, and six hundred openings leading into channel 37. This provides an identical holding area for each channel. In such a board, a sheet of material which just covered channel 32 would be held upon the face 20 by a suction force exerted through six hundred openings; a sheet of material which covered both channels 32 and 33 would be held to the board face 20 by suction force exerted through twelve hundred openings, etc.

The openings 50 are of a substantially small diameter, so that a great vacuum force is not exerted upon any one portion of the sheet supported thereon, but the force is distributed over the entire sheet, so that dimpling or wrinkling of the sheet, by virtue of the sheet being sucked into the openings, is avoided.

It will be seen that the manifold 40 has a lip portion 51 adjacent its mouth 41. This lip portion 51 forms a baffle means which directs air flow away from the openings 50, serving to distribute the air reduction among the openings 50, rather than concentrating the same through those openings 50 immediately adjacent the mouth 41.

A valve means B is preferably provided for interconnecting the various channels, as will be subsequently described.

A channel intercommunicating passageway 52 is provided in wall 26, providing for air flow between channels 32 and 33; a channel intercommunicating passageway 53 is provided in wall 27, providing for air flow between channels 33 and 34, such passageway 53 being preferably at the opposite side of the receptacle from passageway 52; a channel intercommunicating passageway 54 is provided in wall 28, providing for air flow between channels 34 and 35, passageway 54 being preferably at the opposite side of the receptacle from passageway 53; a channel intercommunicating passageway 55 is provided in wall 29, providing for air flow between channels 35 and 36, passageway 55 being preferably at the opposite side of the receptacle from passageway 54; and a channel intercommunicating passageway 56 is provided in wall 30, providing for air flow between channels 36 and 37, passageway 56 being preferably at the opposite side of the receptacle from passageway 55. Each valve means B includes a valve member, preferably comprising a valve plate 62; and means 63 for normally maintaining the same in a closed position and automatically closing the same when air pressure in a preceding channel rises above a predetermined amount. Valve plate 62 is supported upon means 63 in juxtaposition to serve the channel intercommunicating passageway adjacent which it is positioned. A valve plate 62 and means 63 is thus provided for each passageway 52, 53, 54, 55 and 56. Means 63 preferably includes a guide rod means 65 secured to its adjacent wall portion, and spring means 66 mounted upon the rod 65. Valve plate 62 is slidably mounted on guide rod means 65 and spring means 66 urges valve plate 62 into abutment with the wall upon which it is supported, for closing the passageway thereof. The valve means B are mounted in juxtaposition with respect to each of the passageways so that the valve plate 62 will open in a direction toward the source of vacuum exhaust.

In this manner, it will be seen that when a sheet of material is placed upon the board face which covers two or more of the channels, that the air which is continuously exhausted from such covered channels by the pump will cause the valve plate 62 in such covered channels to be withdrawn from its valve opening, so that each of the channels are permitted to intercommunicate with each other in supporting the sheet. Thus, if a sheet of material which extends over channels 32, 33, and 34 is placed on face 20, the air being exhausted from channel 32 would cause the valve means B associated with passageway 52 to open, so that channels 32 and 33 intercommunicate with each other, enabling the exertion of suction to the openings 50 leading into both channels 32 and 33; and the air exhausted from channel 33 would cause the valve means B associated with passageway 53 to open, permitting intercommunication between channels 33 and 34, so that suction would now be applied through the openings 50 leading into channels 32, 33 and 34.

The valve means of the respective walls are preferably located so that the valve means of adjacent walls are at the remotest point from each other. This prevents one valve from directly opening into another and provides a situation wherein the air pressure in the channel from which the valve opens is higher adjacent the valve than at any other point in such channel.

The valve member of each valve means is preferably biased to remain closed until substantially two-thirds of the openings 50 of the channel from which it opens have been closed by a sheet of material being placed thereover and will open fully when all of the openings 50 of the channel from which it opens have been closed.

Each means 63 is preferably biased according to the capacity of the exhaust means and the material to be held on face 20.

As to the manner of interconnection of the face 20, back 21, sides 22, brace 25, and walls 26, 27, 28, 29 and 30, the sides 22, brace 25, and walls 26, 27, 28, 29 and 30 are preferably bonded at one end thereof to the face 20, and the back 21 secured to the opposite end thereof, such as by screws 70. This enables removal of the back 21 for cleaning the chamber 23. A gasket 71 may be employed adjacent the back 21, in order to provide an airtight seal. It is, however, to be understood that such gasket 71 is not necessary, as is illustrated in FIGS. 10–12. The elimination of such gasket is desirable when our vacuum copy holder is to be utilized in certain instances, such as for the support of photographic film, when it is desirable to have unobstructed vision entirely through the copy holder.

The material of which the holder is made will be dependent upon the use to which it is to be put. We preferably make our holder out of acrylic plastic. However, the holder may be made of any other material which is of sufficient strength so that it will not collapse under vacuum pressures. The holder may be transparent or opaque.

It is within the scope of our invention to vary the number of openings 50, size of the openings 50, and width of the channels 32, 33, 34, 35, 36 and 37. In this manner, the vacuum in each of the channels may be regulated so that each channel has an identical vacuum, or some channels are provided with a greater vacuum than others.

A partial evacuation of uncovered channels will occur as a result of the resistance of the restricted openings 50 to air flow, such evacuation being directly proportional to the size of holes 50, the number of holes 50, and the displacement capacity of the exhaust means. Our high velocity vacuum system thereby provides a differential in pressure in the center chamber which is great enough to hold material in firm contact with the face immediately upon application of the same, eliminating the requirement to hold such sheet in contact with the holder until sufficient vacuum has been built up to sustain it.

As previously stated, the bias on each spring 66 is preferably such that each valve means will remain closed until approximately two-thirds of the openings 50 in the immediately preceding channel are covered. At this point the valve means will open, opening more fully as more and more of the holes of the preceding chamber are covered, until all of the holes in the preceding chamber are covered. At this point the valve between the channels is fully open, exposing the next outer channel to the full available vacuum. In this manner the succeeding valves open automatically as more and more of the holder surface is covered, until the whole working area of the holder face is covered, and the air is substantially evacuated from the holder.

The total effect is that, starting in the center channel, and working outwardly, only that portion of the board which is in use is evacuated, and any sheetlike material placed thereover is exposed to the vacuum and held firmly in place. Therefore, by activating the exhaust means, and without further adjustment, sheetlike material which may vary in size from that of a postage stamp to a sheet the size of the board capacity may be held. By the same token, a number of sheets may be held in place at the same time, merely by placing the first sheet upon the center of the holder and placing the others progressively outwardly from the center, until the desired number of sheets are in place, or until the entire working area is covered. As a matter of fact, we have individually supported playing cards distributed over the entire face of the holder.

Form C of the invention is substantially identical to form A, and like reference characters have therefore been applied to identical parts. Form C differs from form A in the provision of vacuum manifold 50ª mounted centrally of the holder, leading into chamber 23 through an opening 75ª provided in the back 21ª. Central brace 25ª is preferably cut away as at 76 to provide unobstructed exhaustion of the air from channel 32. The central brace 25ª thus forms, in this modification, a baffle means which serves in the same manner as the brace 25 and manifold lip 51 of form A.

In form D of the invention, the vacuum copy holder is substantially identical to that shown in form A, only a slight modification of the channel intercommunicating passageways of the walls and a slight modification of the back being necessary to accommodate valve means D. Like reference characters have therefore been applied to identical parts. The valve means D may be substituted for any one or all of the value means B of form A of the invention, and the wall that is described in disclosing the valve means D may therefore be any one of the walls 26, 27, 28, 29 or 30.

As shown in form D of the invention, the wall 80 thereof is preferably provided with a pair of spaced apart channel intercommunicating passageways 81 and 82 and an elongated cylindrical recessed portion 84 to each side of the channel intercommunicating passageways 81 and 82. The cylindrical recessed portions 84 receive reciprocable means 85, as will be subsequently described.

The back 21ᵇ of form D differs from the back 21 of form A in that it is provided with a cylindrical recessed portion 86 adjacent each side of the passageways 81 and 82, which recessed portions cooperate with the recessed portions 84 in supporting reciprocable means 85, as will be subsequently described. The recessed portions 86 are each provided with a port 88 leading exteriorly of the holder and a port 89 leading to the channel adjacent the wall 80 which is in nearest proximity to the exhaust means. The port 89 may, in fact, lead to either channel, dependent upon when it is desired to fully open the valve.

Each valve means D includes a valve member, preferably comprising a valve plate 90; means 91 for normally maintaining the valve plate 90 in a closed position and automatically closing the same when air pressure in a preceding channel rises above a predetermined amount; and reciprocable means 85 for moving the valve plate 90 into position for closure of the channel intercommunicating passageways 81 and 82, and for moving the valve plate 90 away from the channel intercommunicating passageways 81 and 82, for unobstructed flow of air therethrough.

Valve plate 90 is provided with an air flow opening 92, the valve plate 90 being of such dimension and the opening 92 being juxtaposed therethrough in such a position that, as shown in FIG. 10, when the valve plate 90 is in a closed position, the valve plate 90 will prevent flow of air through passageways 81 and 82, and, as shown in FIG. 11, when the air pressure in the channel from which such valve means opens is below a predetermined amount, the opening 92 of valve plate 90 is aligned with passageway 81 of wall 80, and the lowermost portion of valve plate 90 is above passageway 82 of wall 80.

Means 91 is substantially identical to the means 63 of form A of the invention, the same preferably including guide rod means 95 secured to reciprocable means 85, as will be subsequently described, to each side of valve plate 90, and spring means 96 mounted upon the rod 95. Value plate 90 is slidably mounted on guide rod means 95 and spring means 96 urges valve plate 90 into abutment with the wall upon which it is supported.

Reciprocable means 85 preferably includes piston means 98 and spring means 99 which urges piston means 98 in a direction for closure of the valve plate 90 when air pressure in the channel thereof which is in nearest proximity to the exhaust means is above a predetermined amount. A piston means 98 is reciprocably mounted in each recessed portion 84 with the head 100 thereof being received in the adjacent recessed portion 86. The guide rod means 95 is secured to the piston means 98.

Form D of the invention operates as follows:

When air pressure in the channel adjacent wall 80 which is in nearest proximity to the exhaust means is below a predetermined amount, valve plate 90 will be pushed away from wall 80 by the air pressure on the other side of the wall and a limited amount of air flow will be permitted to flow through passageways 81 and 82, past opening 92, and into the channel in nearest proximity to the exhaust means. As air pressure decreases in the channel in nearest proximity to the exhaust means, air will be withdrawn from each recess 86, through port 89, and piston means 98 will be raised as shown in FIG. 11. The raising of piston means 98 also lifts means 91, guide rod means 95 moving through the slot 101 provided in wall 80, to a position whereby the opening 92 of valve plate 90 is aligned with passageway 81, and the lowermost portion of valve plate 90 is above passageway 82. When the valve plate 90 is in this position, the force of spring means 96 will move valve plate 90 back into abutment with wall 80. Unobstructed flow of air will thus be provided through passageways 81 and 82.

When the air pressure in the channel adjacent to wall 80 in nearest proximity to the exhaust means rises above a predetermined amount, spring means 99 of reciprocable means 85 will move piston means down, into the position as shown in FIG. 10. In this position the valve plate 90 closes the passageways 81 and 82.

Valve plate 90 is preferably biased by spring means 96 so that it will remain closed until substantially two-thirds of the openings 50 of the channel from which it opens have been closed by a sheet of material being placed thereover. Spring means 99 of reciprocable means 85 is preferably biased so that the reciprocable means does not become operative until all of the openings 50 of the channel from which it opens have been closed. Each of the spring means 96 and 99 will furthermore be biased in accordance with the capacity of the exhaust means used and the material to be held on face 20.

Various changes in the shape, size and arrangement of parts may be made to the forms of invention herein shown and described, without departing from the spirit of the invention or the scope of the following claims.

We claim:

1. A vacuum copy holder including a receptacle having a plurality of sides, said sides defining a chamber in said receptacle, one of said sides forming a material receiving face adapted to receive copy and provided with a plurality of spaced and distributed openings leading individually into said chamber, a plurality of walls mounted within said chamber and dividing said chamber into a plurality of channels, each of said channels opening to said material receiving face through a predetermined number of the spaced and distributed openings leading to said chamber, exhaust means opening into at least one of said channels for reducing the air pressure therein, baffle means, said baffle means being juxtaposed with respect to said exhaust means to divert air exhaust flow from the direction of the spaced and distributed openings adjacent the opening of said exhaust means and to distribute the air pressure reduction effect of said exhaust means throughout the channel area with which it intercommunicates, and valve means for establishing air flow communication between said channels.

2. A vacuum copy holder including a receptacle having a plurality of sides, said sides defining a chamber in said receptacle, one of said sides forming a material receiving face adapted to receive copy and provided with a plurality of spaced and distributed openings leading individually to said chamber, a plurality of walls mounted within said chamber and dividing said chamber into a plurality of channels, each of said channels opening to said material receiving face through a predetermined number of the spaced and distributed openings leading to said chamber, exhaust means opening into at least one of said channels for reducing the air pressure therein, baffle means, said baffle means being juxtaposed with respect to said exhaust means to distribute the air pressure reduction effect of said exhaust means throughout the channel area with which it intercommunicates, and valve means for establishing air flow communication between said channels.

3. A vacuum copy holder including a receptacle having a plurality of sides, said sides defining a receptacle chamber, one of said sides forming a material receiving face adapted to receive copy and provided with a plurality of spaced and distributed openings leading individually to said chamber, a plurality of walls mounted within said chamber and dividing said chamber into a first centrally disposed channel and a plurality of other channels disposed about said first channel in a manner to form a nested channel relationship in which each successive channel from said first channel extends about the immediately adjacent channel nearest said first channel, each of said channels opening to said material receiving face through a predetermined number of the spaced and distributed openings leading to said chamber, exhaust means opening into said first channel for reducing the air pressure therein, and valve means for establishing air flow communication between said channels, a valve means being provided in each wall which separates one channel from another, said valve means each including means normally maintaining the same in a closed position, the valve means leading from said first channel to the next adjacent channel being adapted to automatically open to the next adjacent channel when the air pressure of said first channel is reduced a predetermined amount, the valve means leading from such next adjacent channel to the next succeeding channel being adapted to automatically open to the next succeeding channel when air pressure in such next adjacent channel is reduced a predetermined amount, and the valve means leading to successive channels being adapted to automatically open the succeeding valve means in a like manner.

4. A vacuum copy holder as specified in claim 3 wherein said means of each said valve means normally maintaining the same in a closed position also includes means for automatically closing the valve means when air pressure in a preceding channel rises above a predetermined amount.

5. A vacuum copy holder as specified in claim 3 wherein said means normally maintaining each valve means in a closed position comprises spring means, said spring means being biased to maintain each valve means opening into a channel in a normally closed position until substantially two-thirds of the spaced and distributed openings leading from the preceding channel to the material face have been closed.

6. A vacuum copy holder as specified in claim 3 wherein each valve means is located at a point remote from the valve means next adjacent thereto so that air pressure adjacent each valve means is higher than the air pressure in the remainder of the channel from which the valve means opens.

7. A vacuum copy holder as specified in claim 3 wherein said means normally maintaining each valve means in a closed position is biased to permit said valve means to fully open when all of the spaced and distributed openings leading from the preceding channel to the material face have been closed.

8. A vacuum copy holder including a receptacle having a plurality of sides, said sides defining a receptacle chamber, one of said sides forming a material receiving face adapted to receive copy and provided with a plurality of spaced and distributed openings leading individually into said chamber, a plurality of walls mounted within said chamber and dividing said chamber into a plurality of channels, each of said channels opening to said material receiving face through a predetermined number of the spaced and distributed openings leading to said chamber, the area of each channel opening to said material receiving face being identical to the area of each of the other channels opening to said material receiving face, exhaust means opening into at least one of said channels for reducing the air pressure therein, and valve means for establishing air flow communication between said channels.

9. A vacuum copy holder including a receptable having a plurality of sides, said sides defining a receptacle chamber, one of said sides forming a material receiving face adapted to receive copy and provided with a plurality of spaced and distributed openings leading individually to said chamber, a plurality of walls mounted within said chamber and dividing said chamber into a plurality of channels, each of said channels opening to said material receiving face through an identical number of spaced and distributed openings leading into said chamber, which openings are of identical cross sectional area, exhaust means opening into at least one of said channels for reducing the air pressure therein, and valve means for establishing air flow communication between said channels.

10. A vacuum copy holder including a receptacle having a plurality of sides, said sides defining a receptacle chamber, one of said sides forming a material receiving face adapted to receive copy and provided with a plurality of spaced and distributed openings leading individually to said chamber, a plurality of walls mounted within said chamber and dividing said chamber into a first centrally disposed channel and a plurality of other channels disposed about said first channel in a manner to form a nested channel relationship in which each successive channel from said first channel extends about the immediately adjacent channel nearest said first channel, each of said channels opening to said material receiving face through a predetermined number of the spaced and distributed openings leading to said chamber, exhaust means opening into said first channel for reducing the air pressure therein, each wall separating one channel from another including a channel intercommunicating passageway, and valve means for each of the channel intercommunicating passageways, said valve means including a valve member and means for mounting said valve member in juxtaposition with respect to a channel intercommunicating passageway for automatically opening and closing the same in accordance with the air pressure of the channel adjact thereto which is in nearest proximity to said exhaust means.

11. A vacuum copy holder as specified in claim 10 wherein said valve member comprises a valve plate of sufficient dimension to cover its associated channel intercommunicating passageway in a given wall, and said means for mounting said valve member comprises guide rod means attached to such given wall, said valve plate being slidably mounted upon said guide rod means for movement toward and away from such given wall, and spring means urging said valve plate to a position of closure against the associated channel intercommunicating passageway of such given wall.

12. A vacuum copy holder as specified in claim 10 wherein said valve member comprises a valve plate having an opening therein juxtaposed with respect to an associated channel intercommunicating passageway whereby to close such passageway when said valve plate is in a first position, to open such passageway when in a second position, and to permit unobstructed flow of air to said passageway when in a third position; and said means for mounting said valve member comprises reciprocable means mounted adjacent the associated channel intercommunicating passageway, said reciprocal means including piston means and means for reciprocating said piston in one direction when the air pressure of the channel adjacent thereto which is in nearest proximity to said exhaust means is below a predetermined amount and reciprocating said piston means in the opposite direction when such air pressure is above a predetermined amount, guide rod means attached to said piston means, said valve plate being slidably mounted upon said guide rod means for movement toward and away from its associated channel intercommunicating passageway, and spring means urging said valve plate to a position of closure with respect to its associated channel intercommunicating passageway.

13. A vacuum copy holder including a receptacle having a plurality of sides, said sides defining a receptacle chamber, one of said sides forming a material receiving face adapted to receive copy and provided with a plurality of spaced and distributed openings leading to said chamber, a wall mounted within said chamber and dividing said chamber into a first centrally disposed channel and at least one other channel disposed about and adjacent said first channel, each of said channels opening to said material receiving face through a predetermined number of the spaced and distributed openings leading to said chamber, exhaust means opening into said first channel for reducing the air pressure therein, said wall separating one channel from another including at least one channel intercommunicating passageway, and valve means for each channel intercommunicating passageway, said valve means including a valve member and means for mounting said valve member in juxtaposition with respect to a channel intercommunicating passageway for automatically opening and closing the same in accordance with the air pressure of the channel adjacent thereto which is in nearest proximity to said exhaust means.

References Cited by the Examiner
UNITED STATES PATENTS

| | | | |
|---|---|---|---|
| 2,452,612 | 11/1948 | Swenberg | 137—535 X |
| 2,814,233 | 11/1957 | Anander. | |
| 3,103,421 | 9/1963 | Marchetto | 98—121 X |

ROBERT C. RIORDON, *Primary Examiner.*